(12) United States Patent
Schwark et al.

(10) Patent No.: US 8,727,173 B2
(45) Date of Patent: May 20, 2014

(54) FUEL TANK ASSEMBLY

(75) Inventors: Travis Edward Schwark, Shorewood, IL (US); Robert Joseph Egging, Oswego, IL (US); James Lester Greene, Bristol, IL (US); Mario Roberto Giovannini, Plainfield, IL (US)

(73) Assignee: Caterpillar Inc., Peoria, IL (US)

( * ) Notice: Subject to any disclaimer, the term of this patent is extended or adjusted under 35 U.S.C. 154(b) by 37 days.

(21) Appl. No.: 13/456,361

(22) Filed: Apr. 26, 2012

(65) Prior Publication Data

US 2013/0284749 A1  Oct. 31, 2013

(51) Int. Cl.
*B65D 90/02* (2006.01)
(52) U.S. Cl.
USPC .......................................... 220/563; 137/574
(58) Field of Classification Search
USPC .............. 220/563, 562, 501, 553, 4.14, 4.12, 220/4.15, 4.13; 137/574, 576, 590
See application file for complete search history.

(56) References Cited

U.S. PATENT DOCUMENTS

| 4,179,036 A | 12/1979 | Pasini |
| 4,453,564 A | 6/1984 | Bergesio |
| 7,117,896 B2 * | 10/2006 | Eberling et al. ............. 137/899 |
| 2011/0000921 A1 | 1/2011 | Hawks |

FOREIGN PATENT DOCUMENTS

| DE | 100 41 678 A1 | 3/2002 |
| JP | 2009-179226 | 8/2009 |

\* cited by examiner

*Primary Examiner* — Jeffrey Allen
(74) *Attorney, Agent, or Firm* — Finnegan, Henderson, Farabow, Garrett & Dunner LLP

(57) ABSTRACT

A baffle system for guiding fuel stored within a fuel tank is disclosed. The baffle system may include first and second baffle walls. Each of the first and second baffle walls may be formed from inner, intermediate, and outer portions. Each inner portion may extend from the respective intermediate portion. Each outer portion may extend from the respective intermediate portion, with an angle at a junction of the outer and intermediate portions being between approximately 120 degrees and 150 degrees. The first and second baffles walls may form a partially-closed volume with the first and second inner and intermediate portions, where the partially-closed volume may be configured to retain fuel guided into the volume by the first and second outer portions.

17 Claims, 3 Drawing Sheets

FUEL TANK ASSEMBLY

TECHNICAL FIELD

The present disclosure relates generally to a fuel tank assembly and, more particularly, to a fuel tank assembly including a baffle system.

BACKGROUND

A mobile machine, such as a compact, small, midsize, or large wheel loader may be used to perform one or more of a variety of tasks on a worksite. For example, a midsize wheel loader (an MWL) may be used to pick up material from one location on the worksite, and to load the material onto another machine at another location on the worksite. Specifically, the MWL may have a bucket installed on its front end, and the MWL may be used to pick up dirt, stones, or construction debris with the bucket, and to load the materials into the dump bed of a dump truck. The MWL may also be used to carry material between locations on the worksite. In particular, the MWL may carry construction materials with a forklift attachment that is installed on its front end.

In general, the MWL has an internal combustion engine that provides power to the machine. The engine burns diesel fuel that is stored in fuel tank prior to combustion. The fuel tank is shaped to direct the fuel stored therein towards an open end of a draw tube that is located in the fuel tank. The draw tube draws the fuel out of the fuel tank and delivers the fuel to a fuel line that is connected to the engine. Usually, the open end of the draw tube is located at a lowermost portion of the fuel tank.

U.S. Patent Publication No. 2011/0000921 to Hawks discloses a baffle arrangement that is used in the fuel tank. In particular, the baffle arrangement is used to guide fuel stored in the tank towards the open end of the draw tube.

The baffle arrangements set forth in the Hawks publication suffer from numerous disadvantages, however. For example, specialized tooling must be used to produce the baffles that are formed from spiral walls. This is because each of the walls has radii that vary along the length of the wall. Thus, the walls are neither simple nor inexpensive to manufacture. Also, with respect to the baffles than include walls formed of straight wall segments, the walls include an excessive number of bends. Further, the passages formed between the walls, into which the fuel flows, are narrow and may not permit a sufficient volume of fuel to be directed towards the draw tube. Thus, this baffle arrangement may not provide a sufficient amount of fuel to the engine to prevent it from stalling.

The disclosed fuel tank assembly is directed to overcoming one or more of the problems set forth above and/or other problems of the prior art.

SUMMARY

The disclosure may provide a baffle system for guiding fuel stored within a fuel tank. The baffle system may include a first baffle wall formed from first inner, intermediate, and outer portions. The first inner portion may extend from the first intermediate portion. The first outer portion may extend from the first intermediate portion, with an angle at a juncture of the first outer and intermediate portions being between approximately 120 degrees and 150 degrees. The baffle system may also include a second baffle wall formed from second inner, intermediate, and outer portions. The second inner portion may extend from the second intermediate portion. The second outer portion may extend from the second intermediate portion, with an angle at a juncture of the second outer and intermediate portions being between approximately 120 degrees and 150 degrees. The first and second baffles walls may form a partially-closed volume with the first and second inner and intermediate portions, the partially-closed volume being configured to retain fuel guided into the volume by the first and second outer portions.

The disclosure may further provide a fuel tank assembly, which may include a fuel tank having an interior that is configured to store liquid fuel therein, a draw tube including an open end that is configured to draw fuel stored within the fuel tank, and a baffle system located within the interior of the fuel tank. The baffle system may be configured to guide fuel towards the open end of the draw tube. The baffle system may include a first baffle wall formed from first inner, intermediate, and outer portions. The first inner portion may extend from the first intermediate portion. The first outer portion may extend from the first intermediate portion, with an angle at a juncture of the first outer and intermediate portions being between approximately 120 degrees and 150 degrees. The baffle system may also include a second baffle wall formed from second inner, intermediate, and outer portions. The second inner portion may extend from the second intermediate portion. The second outer portion may extend from the second intermediate portion, with an angle at a juncture of the second outer and intermediate portions being between approximately 120 degrees and 150 degrees. The first and second baffles walls may be placed relative to one another to form a partially-closed volume with the first and second inner and intermediate portions in which the draw tube is located, the partially-closed volume being configured to retain fuel guided into the volume by the first and second outer portions.

The disclosure may still further provide a method of forming a baffle system configured to guide fuel stored in an interior of a fuel tank to an open end of a draw tube. The method may include forming a first baffle wall, forming a second baffle wall, and placing the first and second baffles walls relative to one another to form a partially-closed volume. Forming the first baffle wall may include forming first inner, intermediate, and outer portions, where the first inner portion extends from the first intermediate portion, and the first outer portion extends from the first intermediate portion, with an angle at a juncture of the first outer and intermediate portions being between approximately 120 degrees and 150 degrees. Forming the second baffle wall may include forming second inner, intermediate, and outer portions, where the second inner portion extends from the second intermediate portion, and the second outer portion extends from the second intermediate portion, with an angle at a juncture of the second outer and intermediate portions being between approximately 120 degrees and 150 degrees. The partially-closed volume may be formed with the first and second inner and intermediate portions, such that the partially-closed volume is configured to retain fuel guided into the volume by the first and second outer portions.

DETAILED DESCRIPTION

Figure 1:
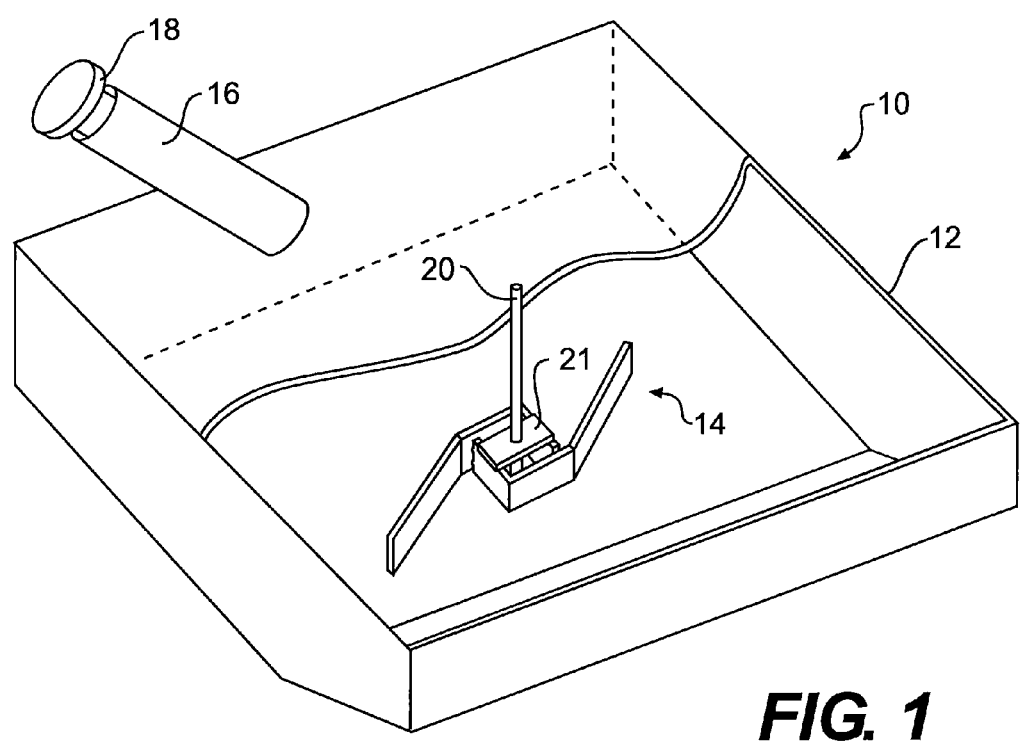
FIG. 1 is an isometric view of an exemplary disclosed fuel tank assembly.

FIG. 1 illustrates an exemplary fuel tank assembly 10, which may include a fuel tank 12 (shown with a top portion partially removed) having a baffle system 14 located within the interior of fuel tank 12. Fuel tank assembly 10 may be installed in a machine that is used to perform one or more of a variety of tasks on a worksite. The machine may have a fuel system (not shown), including one or more fuel lines, which delivers liquid fuel stored in the interior of fuel tank 12 to an internal combustion engine (not shown) of the machine. The engine may burn the fuel to produce power that propels the machine on the worksite and/or that powers a tool or other system of the machine. For example, when the machine is a midsize wheel loader (an MWL), fuel tank 12 may store diesel fuel. The MWL may have a fuel system that delivers the diesel fuel to an internal combustion engine, which burns the fuel to provide power to drive the MWL over the worksite as well as to power movement of an attachment installed on the machine. Whether or not the machine is an MWL, the engine need not burn diesel fuel. Instead, fuel tank 12 may store gasoline, ethanol, or any other type of liquid fuel that is burned by the machine's engine.

Fuel tank 12 may be installed in various locations on the machine. For example, when the machine is an MWL, fuel tank 12 may be installed at a lowermost location at the back end of the machine. At this location, fuel tank 12 may be more easily accessed for installation, repair, and/or filling with fuel.

The particular shape of fuel tank 12 may be based on a variety of factors. For example, fuel tank 12 may be shaped to fit a specific installation location on the machine. Alternately or additionally, fuel tank 12 may be shaped to facilitate the flow of the liquid fuel stored therein towards a bottom or lowermost portion of fuel tank 12. As shown in FIG. 1, fuel tank 12 may include a sloped wall. This sloped wall may facilitate the flow of fuel toward the bottom of fuel tank 12. The sloped wall may also provide a desired clearance between fuel tank 12 and a sloped surface of the worksite when fuel tank 12 is installed at the lowermost location at the back end of the MWL. Fuel tank 12 is not required, however, to include a sloped wall. Alternately, fuel tank 12 may include multiple sloped walls, and/or a different wall of fuel tank 12 may be sloped.

Fuel tank assembly 10 may include a filler tube 16. Filler tube 16 may be used to deliver the fuel to the interior of fuel tank 12, such as from a fuel dispenser (often referred to as a "gas pump") at a filling station. Filler tube 16 may be of an appropriate length and/or shape to facilitate filling of fuel tank 12.

An end of filler tube 16 may be closed by a filler tube cap 18, which is removably secured to filler tube 16. Specifically, filler tube cap 18 and filler tube 16 may cooperatively connect to one another, so that filler tube cap 18 may be removed from filler tube 16 to permit filling of fuel tank 12, and so that filler tube cap 18 may be secured to filler tube 16 after fuel tank 12 is filled with fuel. For example, both filler tube cap 18 and filler tube 16 may include cooperating threads. In particular, a mating portion of filler tube cap 18 may include one or more external threads, while a corresponding mating portion of filler tube 16 may include one or more internal threads that are sized, shaped, and located to cooperate with the threads of filler tube cap 18.

A draw tube 20 may be used to draw the fuel out of fuel tank 12 for burning by the machine's internal combustion engine. For example, the machine's fuel system may use a fuel pump and one or more fuel lines that are connected to the engine (not shown) to draw the fuel stored in the interior of fuel tank 12 through draw tube 20. Specifically, an open end of draw tube 20 may be positioned to draw the fuel from the lowermost portion of fuel tank 12, so that the machine's fuel system may provide fuel to the machine's engine even when a relatively small amount of fuel is present in fuel tank 12. A connecting plate 21 may be used to locate and/or retain draw tube 20 relative to baffle system 14

Figure 2:
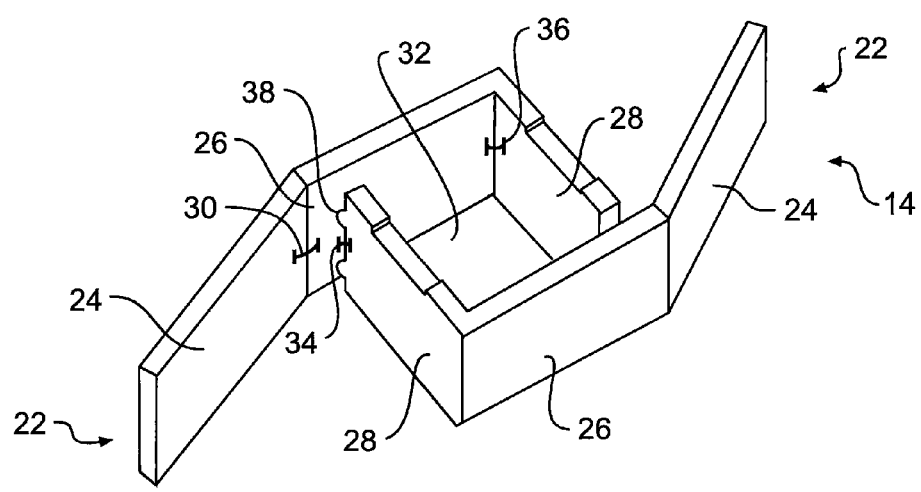
FIG. 2 is a detailed isometric view of a portion of the exemplary disclosed fuel tank assembly of FIG. 1.

Baffle system 14 may be used to guide the liquid fuel stored in fuel tank 12 to the open end of draw tube 20 that is positioned within baffle system 14. Thus, use of baffle system 14 may allow the machine in which fuel tank assembly 10 is installed to operate on a worksite having a variety of slopes and contours, because baffle system 14 may prevent the fuel from flowing away from draw tube 20 when the orientation of the machine changes, which in turn may prevent the engine of the machine from stalling due to lack of fuel. FIG. 2 illustrates details of baffle system 14 installed within the interior of fuel tank 12.

As shown in FIG. 2, baffle system may 14 include two (2) baffle walls 22. Baffle walls 22 may be generally the same size and shape as one another, and may be installed near one another, such that one baffle wall 22 is rotated approximately 180 degrees relative to the other baffle wall 22 and baffle walls 22 are spaced apart from one another. Each baffle wall 22 may include an outer portion 24, an intermediate portion 26, and an inner portion 28. Outer portion 24 may guide the fuel stored within the interior of fuel tank 12 towards intermediate and inner portions 26 and 28. For each baffle wall 22, an angle 30 formed at a juncture of outer portion 24 and intermediate portion 26 may be between approximately 100 degrees and 170 degrees. As shown in the figure, outer portion 24 may be directly connected to intermediate portion 26 without any additional portion being disposed therebetween.

Intermediate portions 26 and inner portions 28 of both baffle walls 22 may be positioned relative to one another to form a partially-closed volume 32, such that the fuel guided by outer portions 24 may flow into and may be retained within volume 32. Specifically, baffle walls 22 may be positioned relative to one another so that each intermediate portion 26 faces and is approximately perpendicular to inner portion 28 of the opposite baffle wall 22, with relatively small gaps 34 between intermediate and inner portions 26 and 28 (only one gap 34 being shown in FIG. 2). Thus, the fuel guided by outer portions 24 may flow through gaps 34 and may be retained within partially-closed volume 32, so that the fuel may be drawn into the open end of draw tube 20 that is located within volume 32. For each baffle wall 22, an angle 36 formed at a juncture of intermediate portion 26 and inner portion 28 may be between approximately 85 and 95 degrees, and may be approximately 90 degrees such that intermediate and inner portions 26 and 28 are approximately perpendicular to one another. As shown in the figure, inner portion 28 may be directly connected to intermediate portion 26 without any additional portion being disposed therebetween. Either or both of gaps 34 may have a width of between approximately 10 mm and 50 mm, the width being measured as a closest distance between intermediate portion 26 of one baffle wall 22 and inner portion 28 of the other baffle wall 22. Thus, as a result of the above arrangement, the relatively large angle 30 between outer and intermediate portions 24 and 26 may ensure that when baffle walls 22 are positioned to form partially-closed volume 32, a sufficient amount of fuel guided by outer portions 24 may be permitted to flow through gaps 34 into partially-closed volume 32.

As shown in FIG. 2, each inner portion 28 may include one or more protrusions 38 extending from its free end, which is the end of inner portion 28 opposite the juncture with intermediate portion 26 (FIG. 2 showing two (2) protrusions 38 on one baffle wall 22). Protrusions 38 may facilitate assembly of baffle system 14. Specifically, for each baffle wall 22, protrusions 38 may be placed in contact with intermediate portion 26 of the opposite baffle wall 22, while still maintaining gaps 34 between baffle walls 22. Although not required, inner surfaces of one or both intermediate portions 26 may include openings, indents, or other structural features that engage or mate with protrusions 38. For example, intermediate portions 26 may include through holes into which protrusions 38 are placed. Although the drawings show baffle system 14 using protrusions 38, protrusions 38 are not required to be included on either or both baffle walls 22. Further, either or both baffle walls 22 may include a single protrusion 38, may include more than two protrusions 38, or may omit protrusions altogether. Also, protrusions 38 are not limited to any particular shape, but may be generally semicircular, rectangular, or any other shape.

Figure 3:
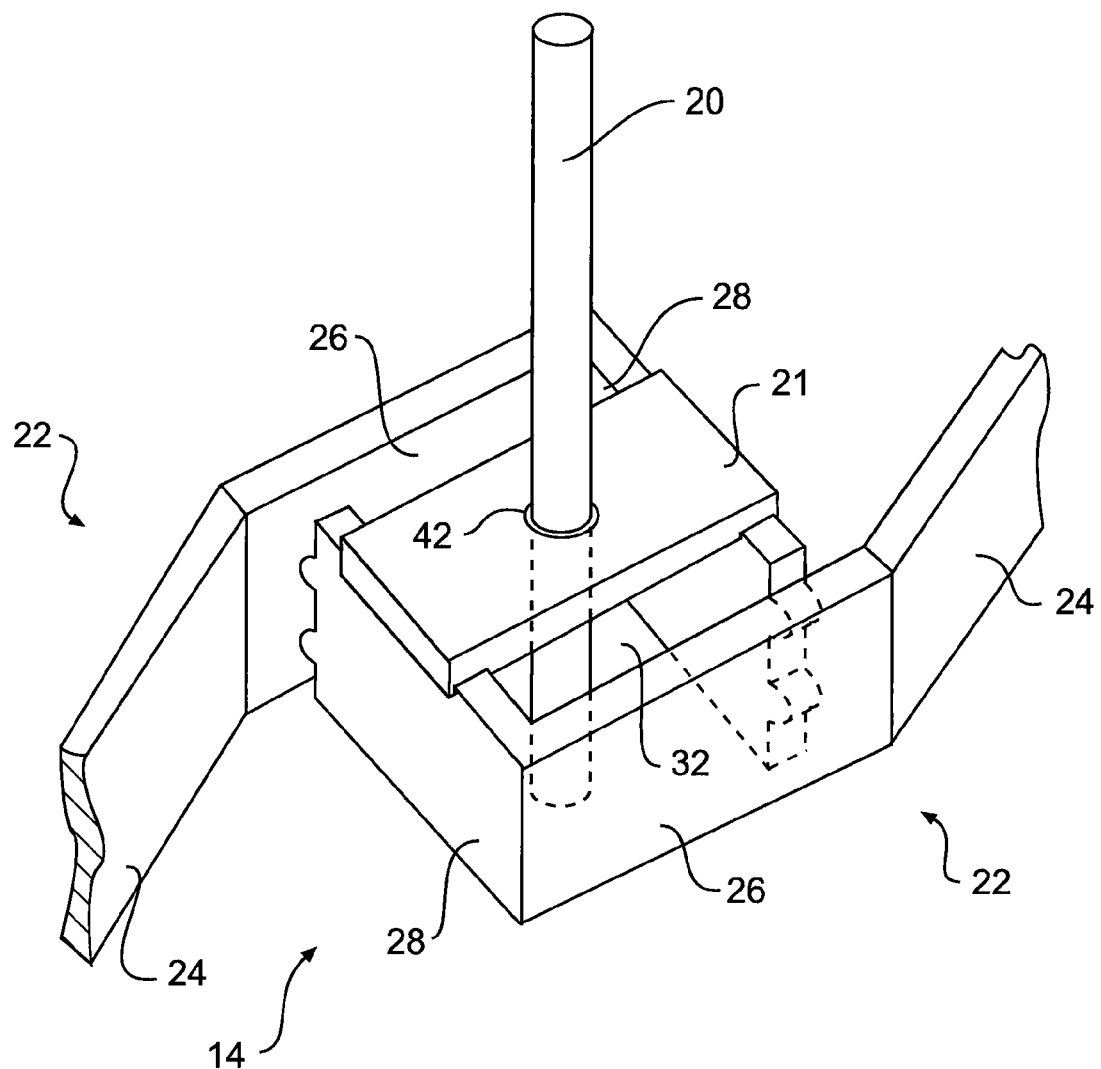
FIG. 3 is another detailed isometric view of a portion of the exemplary disclosed fuel tank assembly of FIG. 1.

As shown in detail in FIG. 3, draw tube 20 may be disposed within the partially-closed volume 32. Thus, the fuel guided by outer portions 24 to be retained in volume 32, is also guided to the open end of draw tube 20. As FIG. 3 shows, connecting plate 21 may be used to locate and/or retain draw tube 20 relative to baffle system 14. Specifically, connecting plate 21 may be used to maintain the open end of draw tube 20 at a specific location within (e.g., an approximate center) partially-closed volume 32, when draw tube 20 is inserted into a hole 42 formed in connecting plate 21. As discussed above, connecting plate 21 may be connected to each baffle wall 22, such as within a recess formed in an upper surface of each inner portion 28. Although not shown in FIG. 3, in an alternate arrangement connecting plate 21 may be connected to intermediate portions 26 of each baffle wall 22, whether or not one or both intermediate portions 26 include recesses to receive connecting plate 21. Connecting plate 21 is not required, however, to include the structure shown in FIG. 3. For example, connecting plate 21 may include one or more recesses, which may cooperate with one or more protrusions formed in baffle walls 22. Alternately, connecting plate 21 may be entirely omitted from fuel tank assembly 10.

INDUSTRIAL APPLICABILITY

The disclosed fuel tank assembly may be applicable to any machine having a fuel tank that stores liquid fuel burned by the machine's engine, such as a medium wheel loader (an MWL). In exemplary embodiments, fuel tank assembly 10 may include baffle system 14 configured to guide the liquid fuel stored in fuel tank 12 towards an open end of draw tube 20. The following provides an exemplary process for its assembly, with reference to FIG. 4.

In particular, construction and assembly of baffle system 14 may be accomplished as follows. As shown in Step 410 of FIG. 4, the first baffle wall 22 may be formed from a single piece of relatively thin sheet metal stock, which may be either a ferrous material (e.g., stainless steel) or a nonferrous material (e.g., aluminum). A blanking (shearing) operation may be used on the sheet metal stock in order to form a blank, which is then bent to form the first baffle wall 22. Thus, the blank may be sized such that the resulting baffle wall 22 may have a specified overall length and width. The blank may be bent, either during shearing or after being sheared from the stock, to form the specified angle 30 between outer and intermediate portions 24 and 26 as well as to form the specified angle 36 between intermediate and inner portions 26 and 28. This same process may be used to form the second baffle wall 22, the blank for this baffle wall 22 being sheared from either the same stock as or different stock than the first baffle wall 22. Shearing and/or bending of the second baffle wall 22 may occur at a same time as or at different times than the first baffle wall 22. Alternately, one or both baffle walls 22 may be formed from a number of separate portions that are connected together to form baffle walls 22. For example, each of outer, intermediate, and inner portions 24, 26, and 28 may be separately formed, such as by blanking, and the separately-blanked portions may then be welded together.

When one or both baffle walls 22 include protrusions 38, protrusions 38 may be formed during the shearing of the blank, during bending of the blank, or at another time. Protrusions 38 need not be formed by shearing, however, or even by a material removal operation. For example, protrusions 38 may initially be formed separate from baffle walls 22, and then may be connected to baffle walls 22, such as by a mechanical connection. The connection may include welding or the use of an adhesive. As discussed above, protrusions 38 may be entirely omitted, however.

Figure 4:
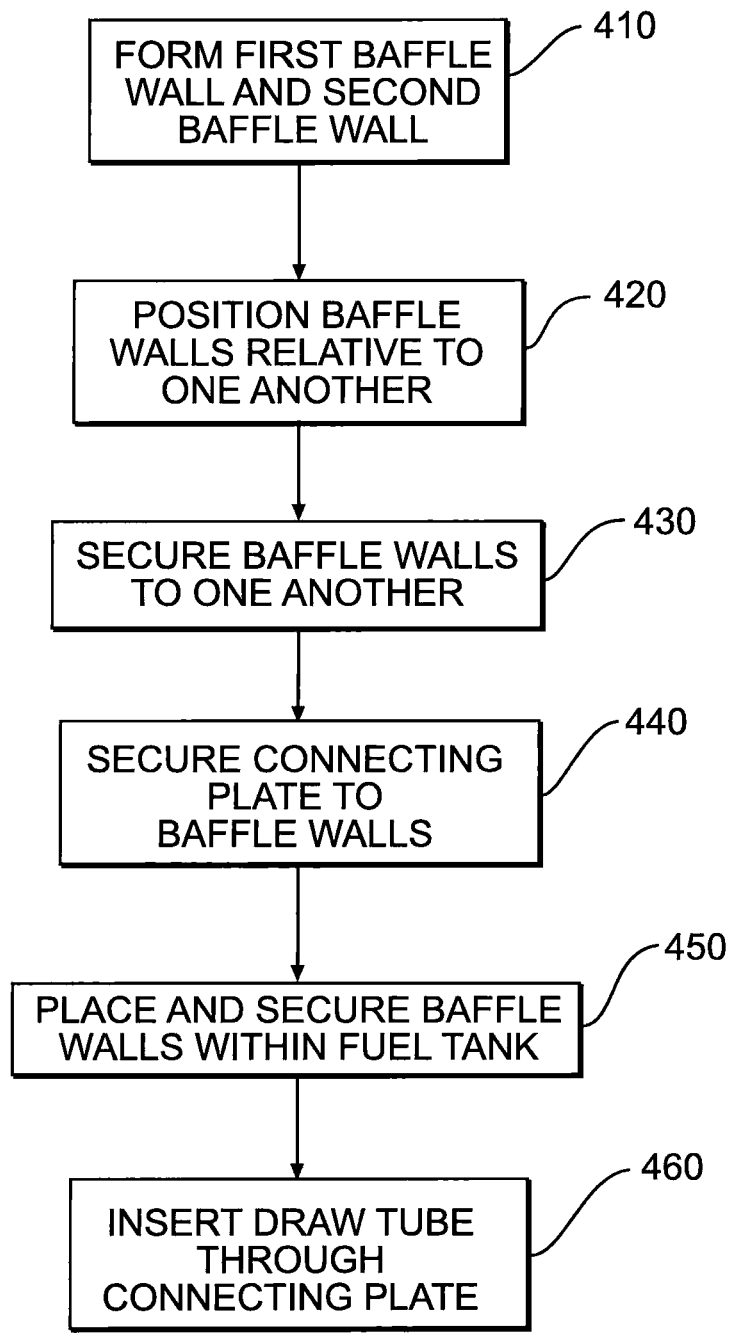
FIG. 4 is a block diagram of an exemplary process of assembling the fuel tank assembly of FIG. 1.

As shown in Step 420 of FIG. 4, baffle walls 22 may be positioned relative to one another, so that gaps 34 are formed between intermediate portions 26 and inner portions 28 of opposite baffle walls 22. This positioning also results in the formation of partially-closed volume 32, which may be used to retain the fuel in proximity to the open end of draw tube 20 placed in volume 32. When both baffle walls 22 include protrusions 38, protrusions 38 of each baffle wall 22 may contact intermediate portions 26 of the opposite baffle wall 22.

As shown in Step 430 of FIG. 4, baffle walls 22 may be secured to one another, such as by mechanical connections between protrusions 38 and intermediate portions 26. The connections may include welds or the use of an adhesive between protrusions 38 and the opposite baffle wall 22. It is to be understood, however, that Step 430 may be entirely omitted, as baffle walls 22 may be connected to one another as discussed below.

As shown in Step 440 of FIG. 4, when baffle system 14 includes connecting plate 21, connecting plate 21 may be secured to baffle walls 22. For example, connecting plate 21 may be placed within recesses formed in upper surfaces of inner portions 28. These recesses may be formed during blanking of the baffle walls 22, or at another time. Connecting plate 21 may be retained within the recesses by friction, or the recesses may be oversized such that connecting plate 21 may move within the recesses. Alternately, the recesses may be entirely omitted, with connecting plate 21 being placed directly on the upper surfaces of inner portions 28. Connecting plate 21 may be mechanically connected to one or both baffle walls 22. The connections may include welds or the use of an adhesive between connecting plate 21 and baffle walls 22. Connecting of connecting plate 21 may occur before, during, or after connection of baffle walls 22 to one another. Further, connecting plate 21 may be formed by a blanking operation, before, during, or after blanking and/or bending of either or both baffle walls 22, and connecting plate 21 may be formed from the same stock as or different stock than either or both baffle walls 22. Hole 42 in connecting plate 21 may be formed, such as by a punching operation, during blanking of connecting plate 21 or at another time. As discussed above, connecting plate 21 may be entirely omitted from fuel tank assembly 10.

As shown in Step 450 of FIG. 4, baffle walls 22 may be placed within the interior of fuel tank 12, and positioned on the bottom surface of fuel tank 12. A mechanical connection may be formed between baffle walls 22 and the bottom surface, so that baffle arrangement 14 does not move within fuel tank 12. The mechanical connection may include a weld or the use of an adhesive.

As shown in Step 460 of FIG. 4, before, during, or after placing baffle walls 22 within fuel tank 12, draw tube 20 may be inserted through hole 42 in connecting plate 21. Draw tube 20 may be mechanically connected to connecting plate 21. The connection may include a weld or use of an adhesive between the outside of draw tube 20 and connecting plate 21. Alternately, draw tube 20 may remain unconnected to connecting plate 21, so that connecting plate 21 may guide or limit movement of draw tube 20 without rigidly fixing the position of draw tube 20. A gasket may or may not be placed on the outside of draw tube 20 or within hole 42.

Other connections to the machine's fuel system, internal combustion engine, or other systems may be made before, during, or after the above-discussed assembly of fuel tank assembly 10. For example, a fuel pump and one or more fuel lines may be connected between the machine's internal combustion engine and draw tube 20, to deliver the fuel stored in fuel tank 12 to the engine.

Thus, the above-described fuel tank assembly 10 that includes baffle system 14 may provide numerous advantages over other known systems. For example, baffle walls 22 may be easily and inexpensively manufactured, at least because baffle walls 22 may be manufactured by relatively simple forming operations (e.g., by blanking and bending) of readily-available sheet metal stock. Also, each baffle wall 22 may include only two bends that result in outer, intermediate, and inner portions 24, 26, and 28, and each baffle wall 22 may be the same shape as the other baffle wall 22. Still further, the relatively large angle 30 between outer and intermediate portions 24 and 26 may ensure that when baffle walls 22 are positioned opposite one another to form partially-closed volume 32, a sufficient amount of fuel guided by outer portions 24 may be permitted to flow through gaps 34 into partially-closed volume 32. Thus, baffle system 14 may more effectively retain fuel near the open end of draw tube 20, thereby preventing stalling of the machine's internal combustion engine even when a relatively small amount of fuel remains in fuel tank 12.

It will be apparent to those skilled in the art that various modifications and variations can be made to the fuel tank assembly of the present disclosure. It is intended that the specification and examples be considered as exemplary only, with a true scope of the disclosure being indicated by the following claims and their equivalents.

What is claimed is:

1. A baffle system for guiding fuel stored within a fuel tank, the baffle system comprising:
 a first baffle wall formed from first inner, intermediate, and outer portions, the first inner portion extending from the first intermediate portion, and the first outer portion extending from the first intermediate portion, an angle at the juncture of the first outer and intermediate portions being between approximately 120 degrees and 150 degrees;
 a second baffle wall formed from second inner, intermediate, and outer portions, the second inner portion extending from the second intermediate portion, and the second outer portion extending from the second intermediate portion, an angle at the juncture of the second outer and intermediate portions being between approximately 120 degrees and 150 degrees;
 wherein the first and second baffles walls form a partially-closed volume with the first and second inner and intermediate portions, the partially-closed volume being configured to retain fuel guided into the volume by the first and second outer portions;
 wherein the first inner portion includes a first protrusion extending therefrom and contacting the second intermediate portion, and
 wherein the second inner portion includes a second protrusion ending therefrom and contacting the first intermediate portion.

2. The baffle system of claim 1, wherein at least one of the first and second baffle walls is formed of sheet metal stock.

3. The baffle system of claim 1, wherein at least one of the first and second baffle walls is formed by simultaneously blanking and bending sheet metal stock.

4. The baffle system of claim 1, wherein the first inner portion extends approximately perpendicularly from the first intermediate portion.

5. The baffle system of claim 1, wherein
 the first inner portion and the second intermediate portion form a first gap therebetween,
 the second inner portion and the first intermediate portion form a second gap therebetween, and
 the first and second gaps are configured to permit fuel guided by the first and second outer portions to flow into the partially-closed volume.

6. The baffle system of claim 5, wherein the first gap is between approximately 10 mm and 50 mm in width.

7. The baffle system of claim 5, wherein the first inner portion extends approximately perpendicular to the second intermediate portion.

8. The baffle system of claim 7, wherein the second inner portion extends approximately perpendicular to the first intermediate portion.

9. The baffle system of claim 1, wherein
 the first protrusion and second intermediate portion form a first gap between the first and second baffle walls,
 the second protrusion and the first intermediate portion form a second gap between the first and second baffle walls, and
 the first and second gaps are configured to permit fuel guided by the first and second outer portions to flow into the partially-closed volume.

10. The baffle system of claim 9, wherein the first inner portion extends approximately perpendicularly from the first intermediate portion.

11. The baffle system of claim 10, further including:
 a plate connected to the first inner portion and the second inner portion, the plate configured to position a draw tube within the partially-closed volume.

12. A fuel tank assembly, comprising:
 a fuel tank having an interior that is configured to store liquid fuel therein;
 a draw tube including an open end that is configured to draw fuel stored within the fuel tank; and
 a baffle system located within the interior of the fuel tank, the baffle system configured to guide fuel towards the open end of the draw tube, the baffle system comprising:
 a first baffle wall formed from first inner, intermediate, and outer portions, the first inner portion extending from the first intermediate portion, and the first outer portion extending from the first intermediate portion, an angle at a juncture of the first outer and intermediate portions being between approximately 120 degrees and 150 degrees;

a second baffle wall formed from second inner, intermediate, and outer portions, the second inner portion extending from the second intermediate portion, and the second outer portion extending from the second intermediate portion, an angle at a juncture of the second outer and intermediate portions being between approximately 120 degrees and 150 degrees;

wherein the first and second baffles walls form a partially-closed volume with the first and second inner and intermediate portions in which the draw tube is located, the partially-closed volume being configured to retain fuel guided into the volume by the first and second outer portions;

wherein the first inner portion includes a first protrusion extending therefrom and contacting the second intermediate portion, thereby forming a first gap between the first and second baffle walls, wherein the second inner portion includes a second protrusion ending therefrom and contacting the first intermediate portion, thereby forming a second gap between the first and second baffle walls, and wherein the first and second gaps are configured to permit fuel guided by the first and second outer portions to flow into the partially-closed volume.

13. The fuel tank assembly according to claim 12, wherein the first inner portion extends approximately perpendicularly from the first intermediate portion.

14. The fuel tank assembly according to claim 12, wherein the first inner portion and the second intermediate portion form a first gap therebetween, the second inner portion and the first intermediate portion form a second gap therebetween, and the first and second gaps are configured to permit fuel guided by the first and second outer portions to flow into the partially-closed volume.

15. A method of forming a baffle system configured to guide fuel stored in an interior of a fuel tank to an open end of a draw tube, the method comprising:

forming a first baffle wall with first inner, intermediate, and outer portions, where the first inner portion extends from the first intermediate portion, and the first outer portion extends from the first intermediate portion, an angle at a juncture of the first outer and intermediate portions being between approximately 120 degrees and 150 degrees;

forming a second baffle wall with second inner, intermediate, and outer portions, where the second inner portion extends from the second intermediate portion, and the second outer portion extends from the second intermediate portion, an angle at a juncture of the second outer and intermediate portions being between approximately 120 degrees and 150 degrees;

placing the first and second baffles walls relative to one another to form a partially-closed volume with the first and second inner and intermediate portions, where the partially-closed volume is configured to retain fuel guided into the volume by the first and second outer portions;

wherein forming the first baffle wall includes forming a first protrusion on the first inner portion, wherein forming the second baffle wall includes forming a second protrusion on the second inner portion, and wherein placing includes contacting the first protrusion with the second intermediate portion, and contacting the second protrusion with the first intermediate portion.

16. The method of claim 15, wherein forming the first baffle wall includes blanking the first baffle walls from sheet metal stock.

17. The method of claim 15, further comprising:

welding the first protrusion to the second intermediate portion; and welding the second protrusion to the first intermediate portion.

* * * * *